US012530944B2

(12) United States Patent
Gabrielli et al.

(10) Patent No.: US 12,530,944 B2
(45) Date of Patent: Jan. 20, 2026

(54) CHIP DISPENSER FOR REAL MONEY GAME

(71) Applicant: Arcadia Gaming Solutions Ltd., RaAnana (IL)

(72) Inventors: Avey Gabrielli, Tel Mond (IL); Itai Frieberger, Batzra (IL); Shaul Wilenski, Tel-Aviv (IL)

(73) Assignee: Arcadia Gaming Solutions Ltd., RaAnana (IL)

( * ) Notice: Subject to any disclaimer, the term of this patent is extended or adjusted under 35 U.S.C. 154(b) by 249 days.

(21) Appl. No.: 18/276,091

(22) PCT Filed: Oct. 7, 2021

(86) PCT No.: PCT/IL2021/051204
§ 371 (c)(1),
(2) Date: Aug. 7, 2023

(87) PCT Pub. No.: WO2022/074653
PCT Pub. Date: Apr. 14, 2022

(65) Prior Publication Data

US 2024/0304057 A1 Sep. 12, 2024

Related U.S. Application Data

(60) Provisional application No. 63/088,464, filed on Oct. 7, 2020.

(51) Int. Cl.
*A63F 9/00* (2006.01)
*G07F 17/32* (2006.01)

(52) U.S. Cl.
CPC ...... *G07F 17/3216* (2013.01); *G07F 17/3248* (2013.01); *G07F 17/3297* (2013.01)

(58) Field of Classification Search
None
See application file for complete search history.

(56) References Cited

U.S. PATENT DOCUMENTS 4,662,636 A * 5/1987 Crompton ........... G07F 17/3297 273/138.2
5,016,880 A * 5/1991 Berge .................. G07F 17/3244 273/355

(Continued)

FOREIGN PATENT DOCUMENTS

JP 6082947 2/2017
TW 351301 1/1999

(Continued)

OTHER PUBLICATIONS

Supplementary European Search Report and the European Search Opinion Dated Oct. 9, 2024 From the European Patent Office Re. Application No. 21877140.0. (10 Pages).

(Continued)

*Primary Examiner* — Sunit Pandya

(57) ABSTRACT

A chip dispensing system for gaming comprises a plurality of chip dispensing units. Each chip dispensing unit comprises a magazine for storing chips. Each chip is assigned a monetary value. Each chip dispensing unit further comprises a ramp extending from the magazine, and an arm for propelling each dispensed chip toward a chip playing field. Processing circuitry monitors a cumulative value of a series of wagers over a time period, and to determine that a cumulative value of chips dispensed toward the playing field corresponds to a predefined return-to-player percentage of the series of wagers; following receipt of a wager, calculate a value of chips to be added to the chip playing field in order to maintain the predefined return-to-player percentage; and (Continued)

instruct the chip dispensing units to dispense chips having a collective value equivalent to the calculated value toward the chip playing field.

16 Claims, 12 Drawing Sheets

(56) References Cited

U.S. PATENT DOCUMENTS

| | | | | |
|---|---|---|---|---|
| 5,275,402 | A * | 1/1994 | Malavazos .......... | G07F 17/3297 273/138.2 |
| 5,507,490 | A * | 4/1996 | Hagiwara ........... | G07F 17/3297 463/16 |
| 5,553,865 | A * | 9/1996 | Shoemaker, Jr. ..... | A63F 7/0058 221/209 |
| 5,697,611 | A | 12/1997 | Kelly et al. | |
| 6,264,197 | B1 * | 7/2001 | Halliburton ......... | G07F 17/3297 273/138.2 |
| 8,302,966 | B1 * | 11/2012 | Sullivan .............. | G07F 17/3297 273/138.2 |
| 8,986,107 | B2 * | 3/2015 | Nicely ................ | G07F 17/3225 463/25 |
| 9,754,456 | B2 | 9/2017 | Verstraeten | |
| 2003/0073479 | A1 * | 4/2003 | Wilson ................ | G07F 17/3213 463/16 |
| 2010/0230895 | A1 * | 9/2010 | Okuaki ............... | G07F 17/3297 273/138.3 |
| 2019/0206195 | A1 | 7/2019 | Kido | |
| 2020/0273297 | A1 | 8/2020 | Filipour | |

FOREIGN PATENT DOCUMENTS

| | | |
|---|---|---|
| TW | 1351301 | 11/2011 |
| WO | WO 2020/075314 | 4/2020 |
| WO | WO 2022/074653 | 4/2022 |

OTHER PUBLICATIONS

International Preliminary Report on Patentability Apr. 20, 2023 From the International Bureau of WIPO Re. Application No. PCT IL2021/051204. (6 Pages).

International Search Report and the Written Opinion Dated Jan. 18, 2022 From the International Searching Authority Re. Application No. PCT/IL2021/050680 . . . (7 Pages).

* cited by examiner

CHIP DISPENSER FOR REAL MONEY GAME

RELATED APPLICATIONS

This application is a National Phase of PCT Patent Application No. PCT/IL2021/051204 having International filing date of Oct. 7, 2021, which claims the benefit of priority under 35 USC § 119(e) of U.S. Provisional Patent Application No. 63/088,464 filed on Oct. 7, 2020. The contents of the above applications are all incorporated by reference as if fully set forth herein in their entirety.

FIELD AND BACKGROUND OF THE INVENTION

The present invention, in some embodiments, relates to a chip dispenser for a real money game, and more specifically, but not exclusively, to a chip dispenser for a real money coin-pusher type game.

Coin-pusher type games have been utilized in arcades for decades. In a classic coin-pusher type game, a player introduces coins into a playing field either by shooting coins out of a gun or dropping them through a slot. The coin playing field consists of a stationary shelf and a sliding shelf. The objective of the game is to introduce the new coins into the playing field in a location such that the new coins will push existing coins off of the sliding shelf, which will in turn push other existing coins from the stationary shelf. When a player succeeds in pushing the coins off the stationary shelf, the player wins either the coins themselves, or another prize, e.g. tickets, corresponding to the number of coins pushed off the stationary shelf.

In more recent embodiments of coin-pusher type games, the items that are pushed off of the playing field are playing chips having a RFID tag. The value of the playing chips is read with an RFID reader at an outlet of the playing field, and is credited to the account of the player. The playing chips themselves are recycled into the coin-pusher type machine for re-introduction into the playing field.

A real-money game is a game in which a user wagers a bet prior to each play. According to applicable legal regulations, the game is required to pay out a minimum percentage of the wagers, known as a return-to-player value, over a cumulative number of plays. For example, the return-to-player value may be 90%. A slot machine is a well-known example of a real-money game.

SUMMARY OF THE INVENTION

Due to the popularity of coin-pusher type games, it is expected that a real-money coin-pusher type game would be well-received among the playing public. However, existing coin-pusher type games are not capable of guaranteeing the required return-to-player value for wagers over a cumulative number of plays.

It is accordingly an object of the present disclosure to provide a coin-pusher type game that is capable of dispensing playing chips into a playing field that complies with return-to-player regulations. It is another object of the present disclosure to provide an automated chip dispenser that may be used to provide chips to a chip playing field a real-money game. It is another object of the present disclose to provide a system for verifying that chips dispensed from the chip dispenser have a value equal to their expected value, so that when the user succeeds in removing the chips from the playing field, an RFID reader at the outlet of the playing field will be able to read the chips and credit the player with the correct chip value.

According to a first aspect, a chip dispensing system for gaming is disclosed. The chip dispensing system comprises a plurality of chip dispensing units. Each chip dispensing unit comprises a magazine for storing chips. Each chip is assigned a monetary value. Each chip dispensing unit further comprises a ramp extending from an outlet of the magazine, and an arm for propelling each dispensed chip down the ramp and toward a chip playing field. Processing circuitry monitors a cumulative value of a series of wagers over a time period, and to determine that a cumulative value of chips dispensed toward the playing field within the time period corresponds to a predefined return-to-player percentage of the series of wagers; following receipt of a wager, calculate a value of chips to be added to the chip playing field in order to maintain the predefined return-to-player percentage; and instruct one or more of the chip dispensing units to dispense chips having a collective value equivalent to the calculated value toward the chip playing field. By monitoring the cumulative value of chips dispensed toward the playing field, and instructing the chip dispensing units to dispense chips based on this value, the system provides an efficient mechanism for delivering chips while ensuring that the game complies with applicable regulations regarding return-to-player values for real-money games.

In another implementation according to the first aspect, the chip dispensing units dispense chips having a plurality of different monetary values, and each respective chip dispensing unit dispenses chips only having the same monetary value. Optionally, the processing circuitry determines a combination of chips required to be dispensed from each of the chip dispensing units in order to arrive at the calculated value, and to instruct the chip dispensing units to dispense chips in accordance with the determined combination. For example, there may be five chip dispensing units, having values of $1, $5, $10, $100, and $1000. The values assigned to each type of chip may be programmable. For example, the real money game may be programmable to accept a wager of $1 per play, of $10 per play, or of $100 per play. The values of the five different types of chips may be programmable to be lower or higher, in order to correspond to match the scale of the wager. The use of chips with different monetary values enables the system to dispense chips corresponding to various numerical values. Furthermore, because each chip dispensing unit dispenses chips only having the same monetary value, a single quality control device—for example, an RFID reader or a video analyzer, as will be discussed below—may be used to check all chips in the chip dispensing unit.

In another implementation according to the first aspect, each chip comprises an RFID tag, each chip dispensing unit comprises an RFID reader, and the processing circuitry compares a RFID value read from each chip with a preassigned RFID value for said chip, and to instruct delivery of a dispensed chip to the chip playing field only when the RFID tag of said dispensed chip corresponds to its preassigned RFID value. The RFID tag and reader thus function as a quality control device, to ensure that only chips that are confirmed as having their assigned chip value enter the chip playing field. This, in turn, ensures that in the event that a player succeeds in removing a chip from the chip playing field, an RFID reader at the exit of the chip playing field will properly credit the player with the value of that chip. The RFID reader is one embodiment of a quality control device; other quality control devices, such as a video analyzer, may alternatively be used.

In another implementation according to the first aspect, a chute receives chips propelled from each chip dispensing unit, a first outlet slide delivers dispensed chips from the chute to a static slide leading to the chip playing field, and a second outlet slide delivers dispensed chips from the chute to a discard bin. A drive aligns one of the first or second outlet slides with an outlet of the chute. The processing circuitry instructs the drive to align the first outlet slide with the outlet of the chute when the RFID tag of a respective dispensed chip corresponds to its preassigned RFID value, and to align the second outlet slide with the outlet of the chute when the RFID tag of a respective dispensed chip does not correspond with its preassigned RFID value. Advantageously, the drive, chute, and outlet slides may be used to provide a compact, automated system for preventing non-conforming chips from entering the chip playing field.

Optionally, the first outlet slide comprises a plurality of spoons angled relative to a slope of the static slide. The spoons help to direct chips onto the static slide in a plurality of angles, so that the chips fall onto different locations within the chip playing field.

Optionally, the drive rotates an angle of the first outlet slide relative to the static slide, and the processing circuitry instructs the drive to rotate the first outlet slide relative to the static slide prior to delivery of dispensed chips from the chute to the static slide. Optionally, the processing circuitry is configured to instruct rotation of the first outlet slide so as to randomly vary a location in the chip playing field onto which chips are dispensed. Advantageously, the rotation of the first outlet slide helps to direct chips onto the static slide in a plurality of angles, so that the chips fall onto different locations within the chip playing field.

In another implementation according to the first aspect, a coin-pusher type game includes the chip dispensing system of claim 1, and the chip playing field comprises at least one moving shelf and at least one stationary shelf. Advantageously, the chip dispensing system thus is usable to implement a real-money format for a coin-pusher type game.

According to a second aspect, a method for dispensing chips for gaming is disclosed. The method comprises: monitoring a cumulative value of a series of wages over a time period, and determining that a cumulative value of chips dispensed into a chip playing field within the time period corresponds to a predefined return-to-player percentage of the series of wagers; following receipt of a wager, calculating a value of chips to be added to the chip playing field in order to maintain the predefined return-to-player percentage; and instructing one or more chip dispensing units to dispense chips toward the chip playing field. Each chip is assigned a monetary value, and the dispensed chips have a collective value equivalent to the calculated value. Each chip dispensing unit comprises a magazine for storing chips, a ramp extending from an outlet of the magazine, and an arm for propelling each dispensed chip down the ramp and toward the chip playing field. The method further comprises dispensing the chips having said collective value toward the chip playing field. By monitoring the cumulative value of chips dispensed toward the playing field, and instructing the chip dispensing units to dispense chips based on this value, the method provides an efficient process for delivering chips while ensuring that the game complies with applicable regulations regarding return-to-player values for real-money games.

In another implementation according to the second aspect, the method further comprises dispensing chips having a plurality of different monetary values from different chip dispensing units, while dispensing chips only having the same monetary value from each respective chip dispensing unit. Optionally, the method further comprises determining a combination of chips required to be dispensed from each of the chip dispensing units in order to arrive at the calculated value, and instructing the chip dispensing units to dispense chips in accordance with the determined calculation. For example, there may be five chip dispensing units, having values of $1, $5, $10, $100, and $1000. The values assigned to each type of chip may be programmable. For example, the real money game may be programmable to accept a wager of $1 per play, of $10 per play, or of $100 per play. The values of the five different types of chips may be programmable to be lower or higher, in order to correspond to match the scale of the wager. The use of chips with different monetary values enables the dispensing of chips corresponding to any numerical value. Furthermore, because each chip dispensing unit dispenses chips only having the same monetary value, a single quality control device—such as an RFID reader or a video analyzer, as will be discussed below—may be used to check all chips in the chip dispensing unit.

In another implementation according to the second aspect, each chip comprises an RFID tag, and each chip dispensing unit further comprises an RFID reader. The method further comprises reading the RFID tag with the RFID reader, comparing the RFID value read from each chip with a preassigned RFID value for said chip, and delivering a dispensed chip into the chip playing field only when the RFID tag of said dispensed chip corresponds to a preassigned RFID value for said dispensed chip. The RFID tag and reader thus function as a quality control device, to ensure that only chips that are confirmed as having their assigned chip value enter the chip playing field. This, in turn, ensures that in the event that a player succeeds in removing a chip from the chip playing field, an RFID reader at the exit of the chip playing field will properly credit the player with the value of that chip. The RFID reader is one embodiment of a quality control device; other quality control devices, such as a video analyzer, may alternatively be used.

Optionally, a chute receives chips dispensed from each chip dispensing unit, a first outlet slide delivers dispensed chips from the chute to a static slide leading to the chip playing field, and a second outlet slide delivers dispensed chips from the chute to a discard bin. The method further comprises instructing a drive to align the first outlet slide with an outlet of the chute when the RFID tag of a respective dispensed chip corresponds to its preassigned RFID value, and to align the second outlet slide with the outlet of the chute when the RFID tag of a respective dispensed 20 chip does not correspond with its preassigned RFID value. Advantageously, the drive, chute, and outlet slides may be used to provide a compact, automated system for preventing non-conforming chips from entering the chip playing field.

Optionally, the first outlet slide comprises a plurality of spoons angled relative to a slope of the static slide. The spoons help to direct chips onto the static slide in a plurality of angles, so that the chips fall onto different locations within the chip playing field.

Optionally, the method further comprises rotating an angle of the first outlet slide relative to the static slide prior to delivery of dispensed chips from the chute to the static slide. Optionally, the rotating step is performed so as to randomly vary a location on the chip playing field onto which chips are dispensed. Advantageously, the rotation of the first outlet slide helps to direct chips onto the static slide in a plurality of angles, so that the chips fall onto different locations within the chip playing field.

In another implementation according to the second aspect, the chip playing field comprises at least one moving shelf and at least one stationary shelf in a coin-pusher type game. Advantageously, the method thus is usable to implement a real-money format for a coin-pusher type game.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DESCRIPTION OF SPECIFIC EMBODIMENTS OF THE INVENTION

Figure 1:
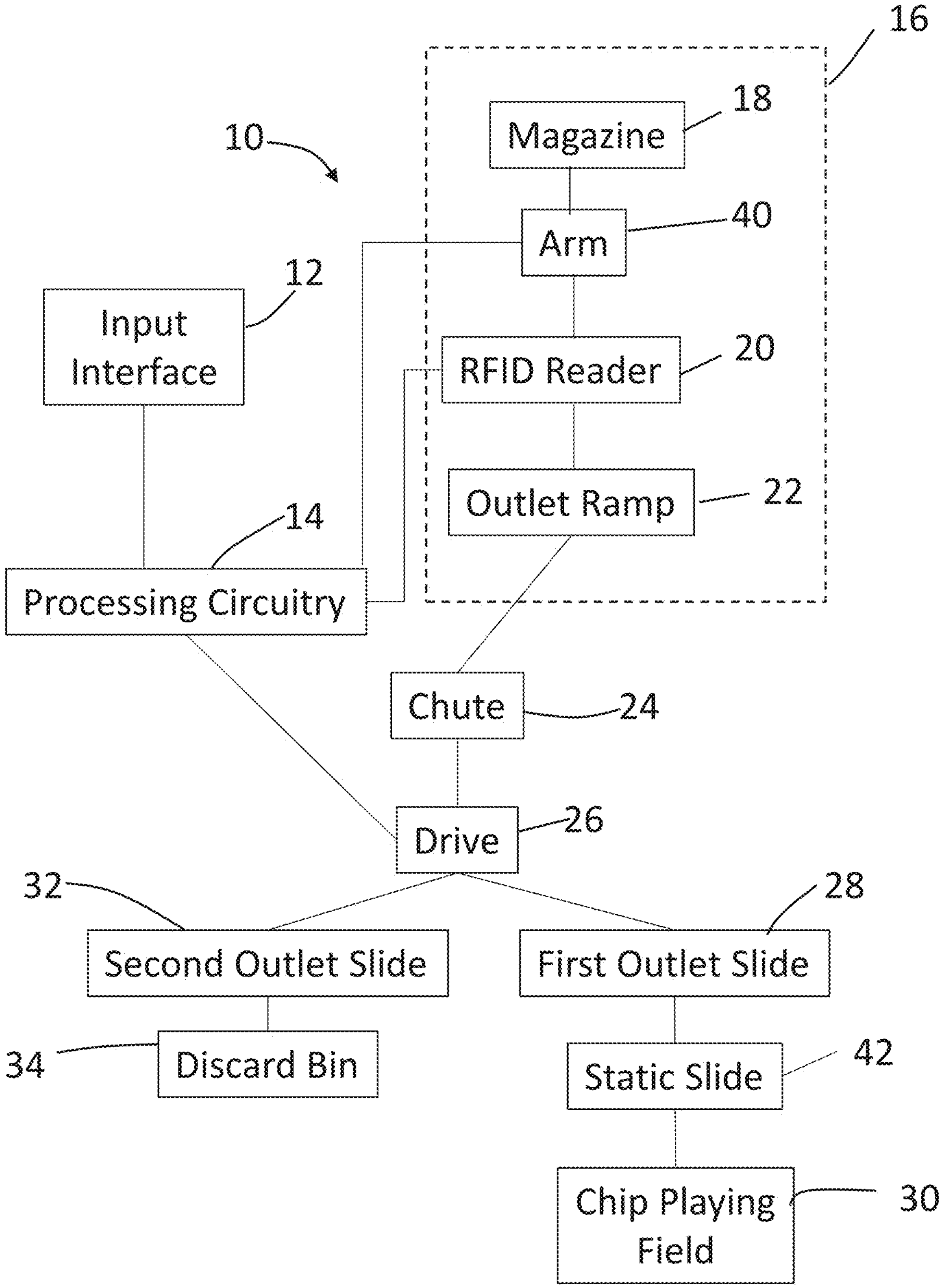
FIG. 1 is a diagram illustrating components of a chip dispensing system for gaming, according to embodiments of the present disclosure.

The present invention, in some embodiments, relates to a chip dispenser for a real money game, and more specifically, but not exclusively, to a chip dispenser for a real money coin-pusher type game.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
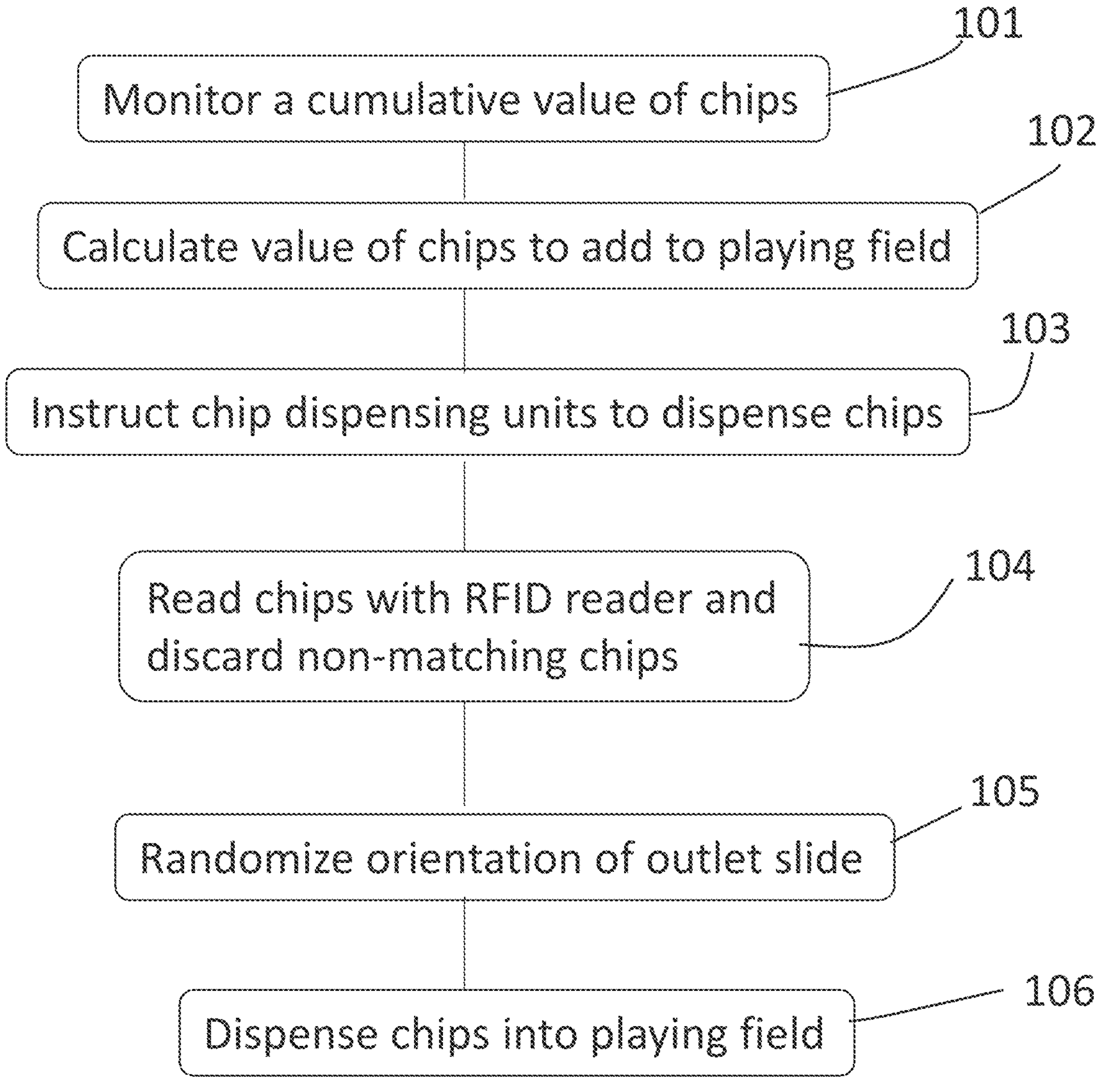
FIG. 2 is a flow chart illustrating steps of a method of dispensing chips into a playing field for gaming, according to embodiments of the present disclosure.

FIGS. 1 and 2 schematically illustrate components of a chip dispensing system 10 and a method for using the chip dispensing system 10 to dispense chips to a chip playing field. Referring to FIG. 1, chip dispensing system 10 includes an input interface 12. The input interface 12 may be, for example, a touch screen, one or more knobs, or a key pad. The input interface 12 is connected to processing circuitry 14. Processing circuitry 14 delivers instructions to, and receives information from one or more arms 40, one or more RFID readers 20, and a drive 26, the functions of which will be described further below.

Processing circuitry 14 may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the processing circuitry 14, partly on the processor 26, as a stand-alone software package, partly on the processing circuitry 14 and partly on a remote computer or entirely on the remote computer or server. In the latter scenario, the remote computer may be connected to the processing circuitry 14 through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Returning to FIG. 1, magazine 18 stores a number of chips, for example, one hundred chips, for delivery into a chip playing field 30.

The chip playing field 30 is a location in which chips are stored during game play. If the game is a coin pusher game, the chip playing field may include at least one stationary shelf and at least one moving shelf. Items other than chips, such as coins, may also be present in the chip playing field 30.

Other sorts of games may be compatible with the chip dispensing device 10. A common feature of such games is that an objective of the player is to remove the chips from the chip playing field 30.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 2, at step 101, the processing circuitry 14 monitors a cumulative value of chips added to the playing field 30 over a time period. The time period may be any suitable time period, for example, a day, a month, a year, or a lifetime of use of the game in which chip dispensing system 10 is incorporated.

At step 102, the processing circuitry calculates a value of chips to add to the playing field 30, based on the value of the input wager, as well as a predetermined return-to-player percentage of cumulative wagers over the time period. In one example, the return-to-player percentage is 90%, and over the time period $900 had been wagered, and $810 worth of chips had been added to the chip playing field 30. A new wager is input for $100. The processing circuitry calculates that, in order to preserve the return-to-player percentage of 90%, it is necessary to add an additional $90 to the chip playing field 30. At step 103, the processing circuitry 14 then instructs the arm 40 to dispense chips to the chip playing field 30. For example, the processing circuitry 14 may instruct an arm 40 to dispense nine chips each having a value of $10.

In the foregoing example, the cumulative value of the chips added to the playing field already matched the return-to-player percentage (i.e., 810/900=90%) . . . . However, applicable regulations typically do not require the return-to-player percentage to be maintained after every play. Rather, it is only necessary that the return-to-player percentage be correct after a cumulative number of plays, or within a cumulative time period—for example, after each day, or after each week. The processing circuitry may thus introduce a different value of chips to the playing field in response to identical bets. The processing circuitry monitors the cumulative value of wagers and the cumulative amount of chips dispensed, so that the return-to-player percentage is maintained during the cumulative time period.

It should be understood that the return-to-player percentage measures the value of chips added over time to the playing field 30, not the value of chips currently found in the playing field. Thus, in the foregoing example, although the $100 wager causes $90 to be added to the chip playing field, the chip playing field 30 may contain any amount of chips up to the cumulative chip value of $900. The specific total of chips in the playing field 30 varies from play to play, based on the skill of prior players in "winning" by removing chips from the playing field 30.

Returning to FIG. 1, and considering step 104 at FIG. 2, following release of each chip from a magazine 18, the chip is read by an RFID reader 20. The RFID reader 20 reads an RFID tag on each chip.

The purpose of the RFID reader 20 is to verify that each chip that is dispensed to the playing field has an RFID tag that codes for its expected value, and that this RFID tag is readable by a corresponding RFID reader at an exit of the chip playing field. For example, in a scenario in which the processing circuitry instructs dispending of nine $10 chips, the RFID reader verifies that each of the nine dispensed chips has an RFID tag that corresponds to a $10 value.

In general, there are three scenarios in which a chip dispensed from a magazine 18 does not properly match its RFID tag. In the first scenario, the chip belongs to the chip dispensing system 10, but is of the wrong value. For example, a $1 chip may have been loaded incorrectly into a magazine 18 with $10 chips. The $1 chip is readable by an RFID reader at the exit of the chip playing field 30. However, introduction of the $1 chip into the field 30 would result in the return-to-player percentage being less than the required value. In a second scenario, the chip is of the correct denomination, but the RFID tag is not functional. Such a chip should not be introduced into the chip playing field, because when the player dislodges it from the chip playing field, the RFID reader at the exit of the chip playing field will not be able to read the RFID tag and credit the player's account. In a third scenario, the item is not a chip at all, but rather another round object like a coin, or a chip from a different game. By reading the RFID tag prior to introducing the chip into the playing field, the chip dispensing system 10 is able to identify non-conforming chips and ensure that they do not enter the playing field.

An arm 40 is used to propel a dispensed chip from the magazine 18 to the location where it is read by RFID reader 20. After the chip is read by the RFID reader 20, the arm 40 propels the dispensed chip to an outlet ramp 22. In the embodiments depicted in the present disclosure, a single arm 40 is used for both steps of moving the chip. In alternative embodiments, a separate arm or propeller may be used for each step. The chip then slides down the outlet ramp 22 toward the chip playing field 30. The ramp 22 thus employs gravity to transport the chip. In an alternative embodiment, a mechanical conveyor may be used to deliver the dispensed chip.

The magazine 18, arm 40, RFID reader 20, and ramp 22, as well as supporting structures connecting between these elements, are referred to herein as a chip dispensing unit 16.

Each chip dispensing unit 16, through a combination of each of its elements, delivers chips having a particular value from a magazine 18, and checks each chip prior to delivery to verify whether the chip is readable as having its designated value. Further components of chip dispensing unit 16 according to some embodiments are illustrated in FIGS. 3-6 and described in the accompanying description.

In embodiments of chip dispensing system 10, there are multiple chip dispensing units 16. The chip dispensing units 16 collectively dispense chips having a plurality of different monetary values. Each respective chip dispensing unit 16 dispenses chips having only the same monetary value. For example, there may be five chip dispensing units 16 for delivering chips with monetary values of $1, $5, $10, $100, and $1000. In such embodiments, each magazine 18 includes a collection of chips each having a particular monetary value. In addition, the monetary value of each chip may be programmable. For example, the real money game may be programmable to accept a fixed wager of $1 per play, of $10 per play, or of $100 per play, or the real money game may be programmable to accept only wagers within a particular range. The values of the five different types of chips may be programmable to be lower or higher, in order to correspond to match the scale of the wager.

In other embodiments, certain of the chips are "phantom" chips. A phantom chip is a chip that has a value that is unknown to the player. For example, there may be four chip dispensing units 16 having chips with values that are known to the player, such as $1, $5, $10, and $100. The fifth chip dispensing unit 16 has chips with a value that is unknown to the player. This value may be, for example, $3. As in the previous embodiments, these phantom chip values are monitored by the processing circuitry to ensure that the cumulative return to player percentage is maintained. An advantage of using phantom chips is that it introduces an element of chance into the playing of the game, because the player will not know whether removing phantom chips from the chip playing field 30 will be more or less profitable than removing chips having known values.

Following propelling of the chip down the ramp 22, the chip enters a chute 24. Chute 24 may have the shape of an inverted triangle, with a long opening at the top, and a narrow exit at the bottom. The long opening is oriented such that chips from each of the ramps 22, which may be arranged in a row above the long opening, enter the chute 24, slide along the inclined edges, and exit at the bottom.

Drive 26 rotates a platform at the bottom of the chute 24, and thereby alternately places a first outlet slide 28 or a second outlet side 32 in alignment with the exit of the chute 24. When the first outlet slide 28 is in alignment with the exit of the chute 24, the chip is deposited onto a static slide 42, from which it slides into chip playing field 30, as indicated in step 106 of FIG. 2. Optionally, at step 105 in FIG. 2, the first outlet slide 28 is rotatable in order to deposit chips onto the static slide 42 at different angles. The orientation of the first outlet slide 28 may be randomized so as to cause chips to be dispensed onto different lateral locations in the playing field 30. When the second outlet slide 32 is in alignment with the exit of the chute 24, the chip is dispensed to discard bin 34.

The processing circuitry 14 is in communication with the RFID readers 20 and the drive 26. If a RFID reader 20 indicates that a chip's RFID tag matches the expected value, the processing circuitry 14 instructs the drive 26 to rotate the platform so that the chip will exit onto the first outlet slide 28. If, on the other hand, the RFID reader cannot read a chip's RFID tag, or if it can read the tag but the tag does not match the expected value, the processing circuitry 14 instructs the drive 26 to rotate the platform so that the chip will exit onto the second outlet slide 32.

Figure 3:
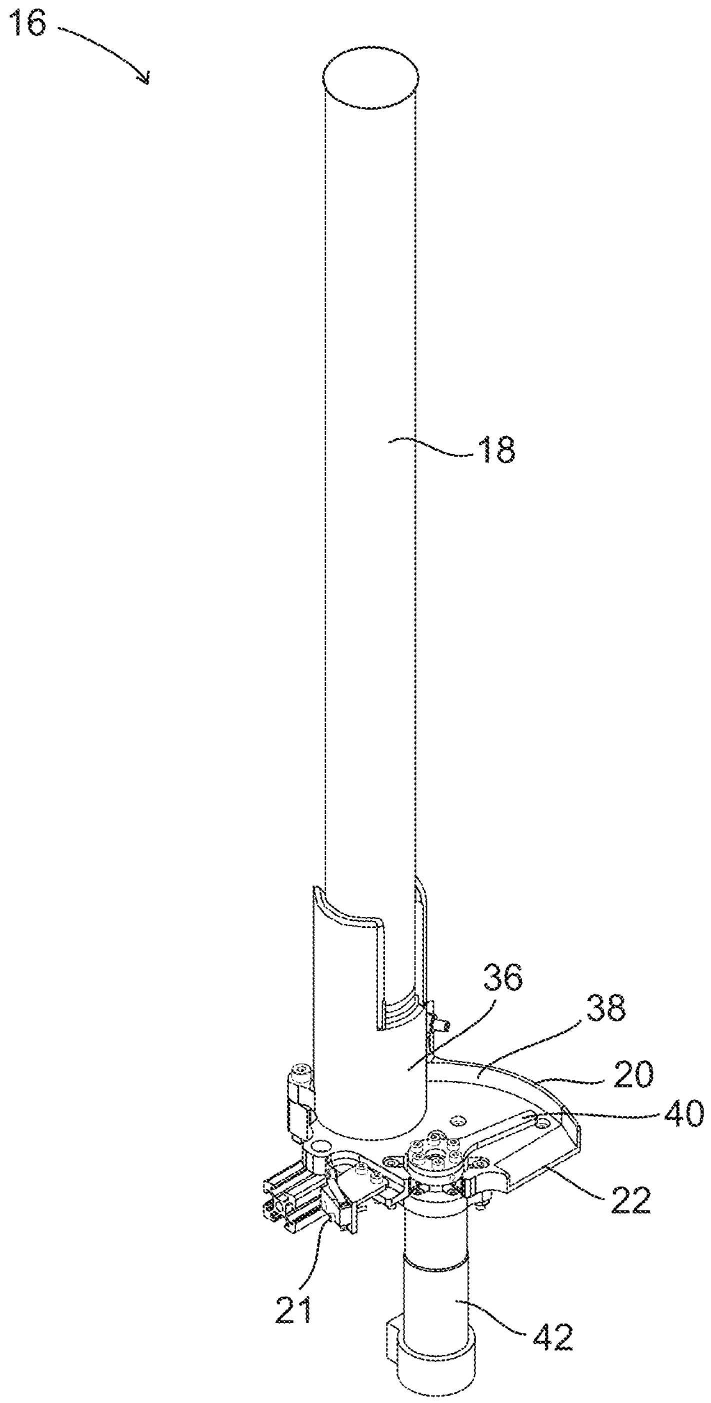
FIG. 3 is a perspective view of a chip dispensing unit, according to embodiments of the present disclosure.
Figure 4:
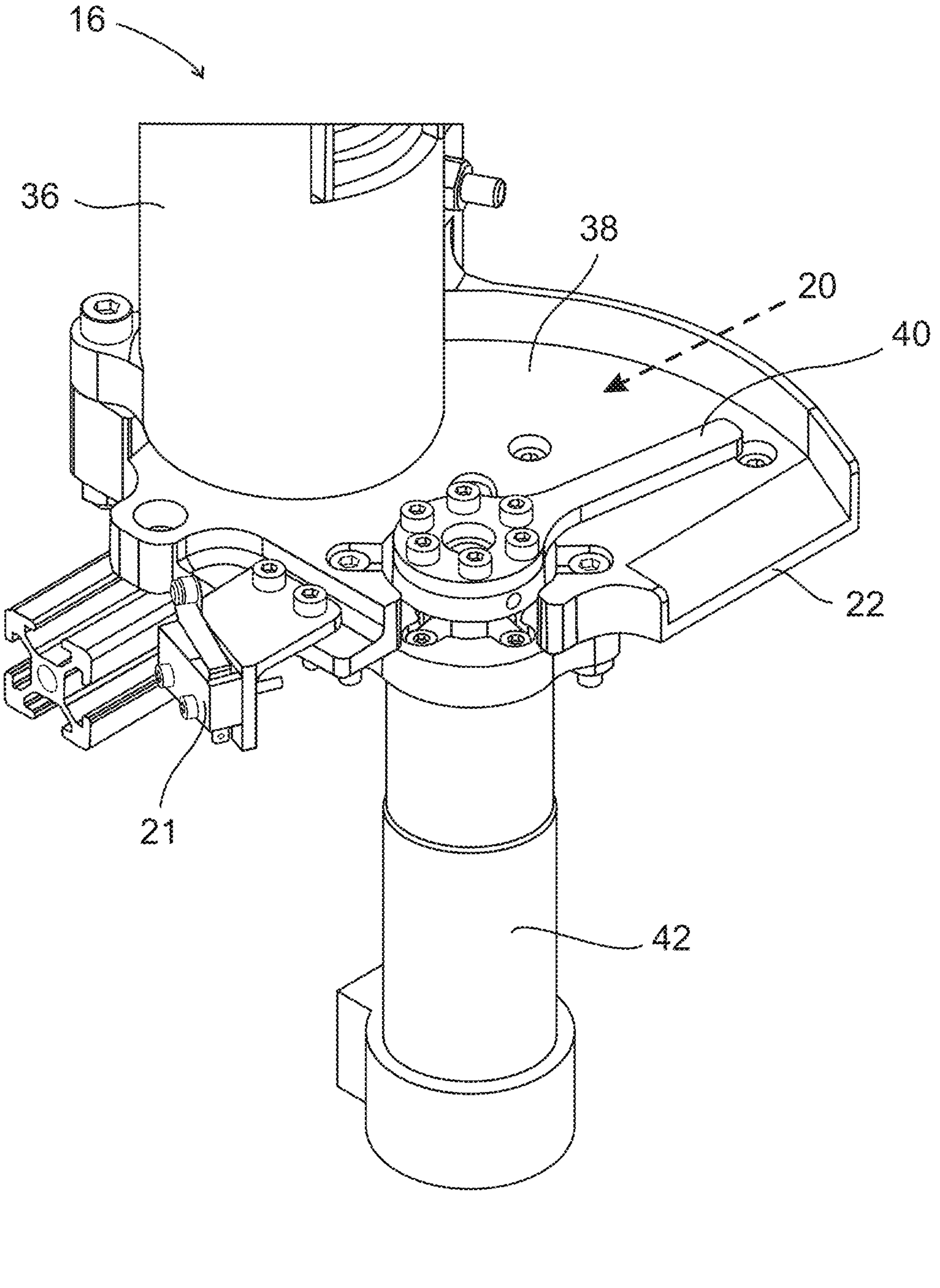
FIG. 4 is a close-up perspective view of the chip dispensing unit of FIG. 3, according to embodiments of the present disclosure.

Referring now to FIGS. 3 and 4, exemplary views of the chip dispensing unit 16 are depicted. As used in the present disclosure, the term "magazine" encompasses any device or structure that is used to store chips prior to entry into the chip playing field 30. In the illustrated embodiments, magazine 18 is a long, tubular structure shaped to hold a stack of chips therein. Magazine 18 may have a removable or retractable bottom cover (not shown), such that when the bottom cover is closed, chips are retained within the magazine 18, and when the cover is open and the magazine 18 is inverted with the open cover downward, chips exit magazine 18 in a downward direction.

In alternative embodiments, magazine 18 may be part of a closed-loop system for recycling chips. In such embodiments, chips that have exited the chip playing field 30 are sorted and conveyed through conduits back to magazines 18 for reintroduction into the chip playing field 30. The open end of magazine 18 from the closed-loop system (i.e., the part that connects with holder 36) may be dimensioned similarly to the open end of magazine 18 having a tubular configuration. Advantageously, the holder 36 is adapted to receive either form of magazine 18.

Magazine 18 is slotted within holder 36. Holder 36 is situated on base 38, with approximately one chip's width between the holder 36 and the base 38. In the illustrated embodiments, magazine 18 does not extend all the way to the base 38, but instead terminates above the base 38. As a result, a number of chips, for example ten chips, drop down from the magazine 18 and are secured in the holder 36 itself. Advantageously, these chips remain available for use even after the magazine 18 is removed, for example, for refilling.

RFID reader 20 is situated beneath the base 38, between holder 36 and a ramp 22.

Arm 40 is situated above the base 38. Arm 40 is rotatable through rotational movement of drive 42. In the illustrated embodiment, the arm 40 rotates in a clockwise direction. As can be recognized by those of skill in the art, an alternative configuration with a counterclockwise rotation is also possible.

Microswitch 21 extends outward from base 38. When the arm 40 rotates clockwise from its position shown in FIG. 4, it will contact microswitch 21. The microswitch 21 registers the contact of arm 40. This contacting of the microswitch 21 is used to relay information to the processing circuitry 14 regarding the location of arm 40 in its circular track around the base 38.

Figure 5:
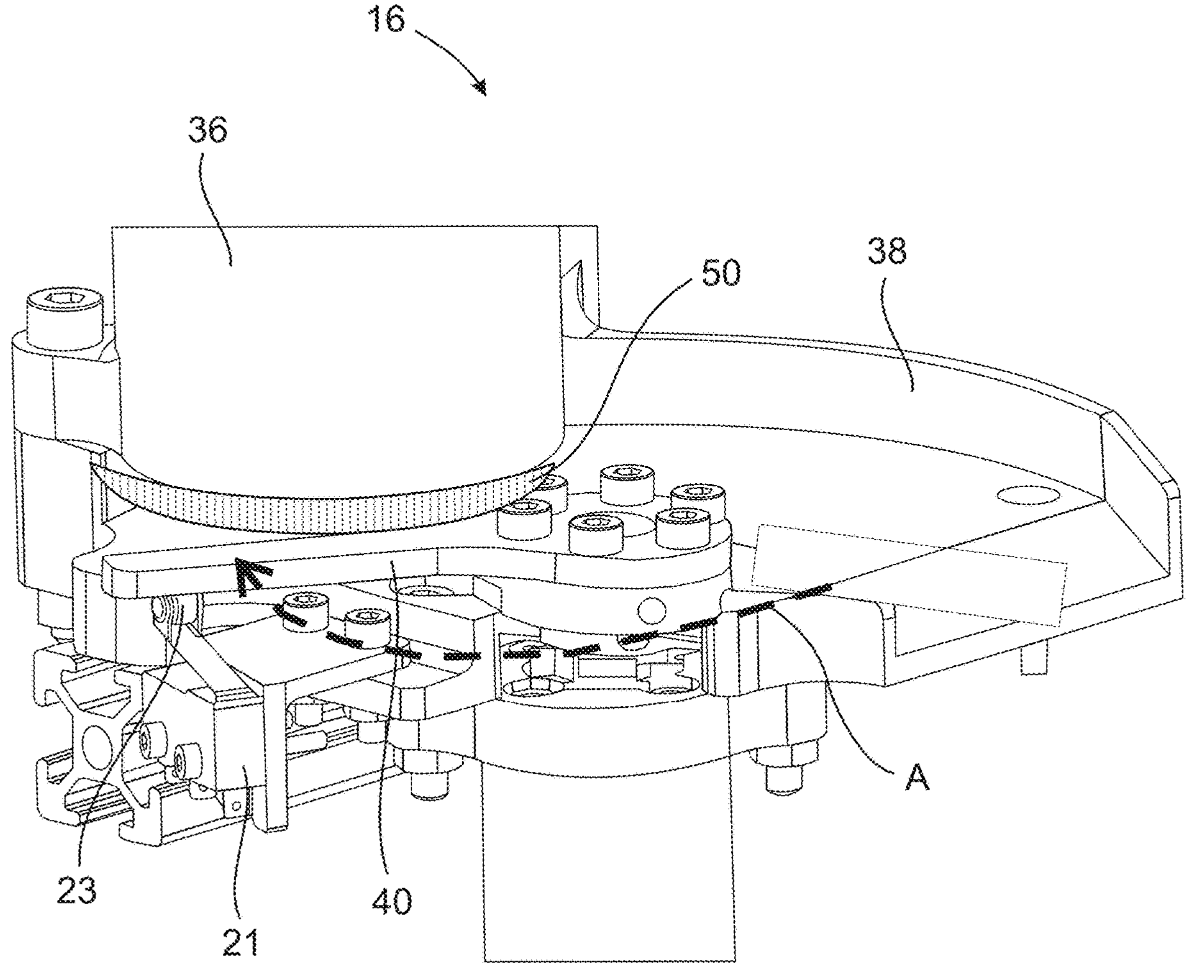
FIG. 5 is a side view of the chip dispensing unit of FIG. 3 illustrating an arm in a position to remove a chip from a chip holder, according to embodiments of the present disclosure.

Referring now to FIG. 5, arm 40 is depicted having traveled along track A from its position in FIGS. 3 and 4, past microswitch 40, and adjacent to holder 36. A chip 50 is partially visible resting on base 38 and under holder 36. When the arm 40 continues in its clockwise motion, it pushes the chip 50 from under holder 36 onto the base 38.

Figure 6:
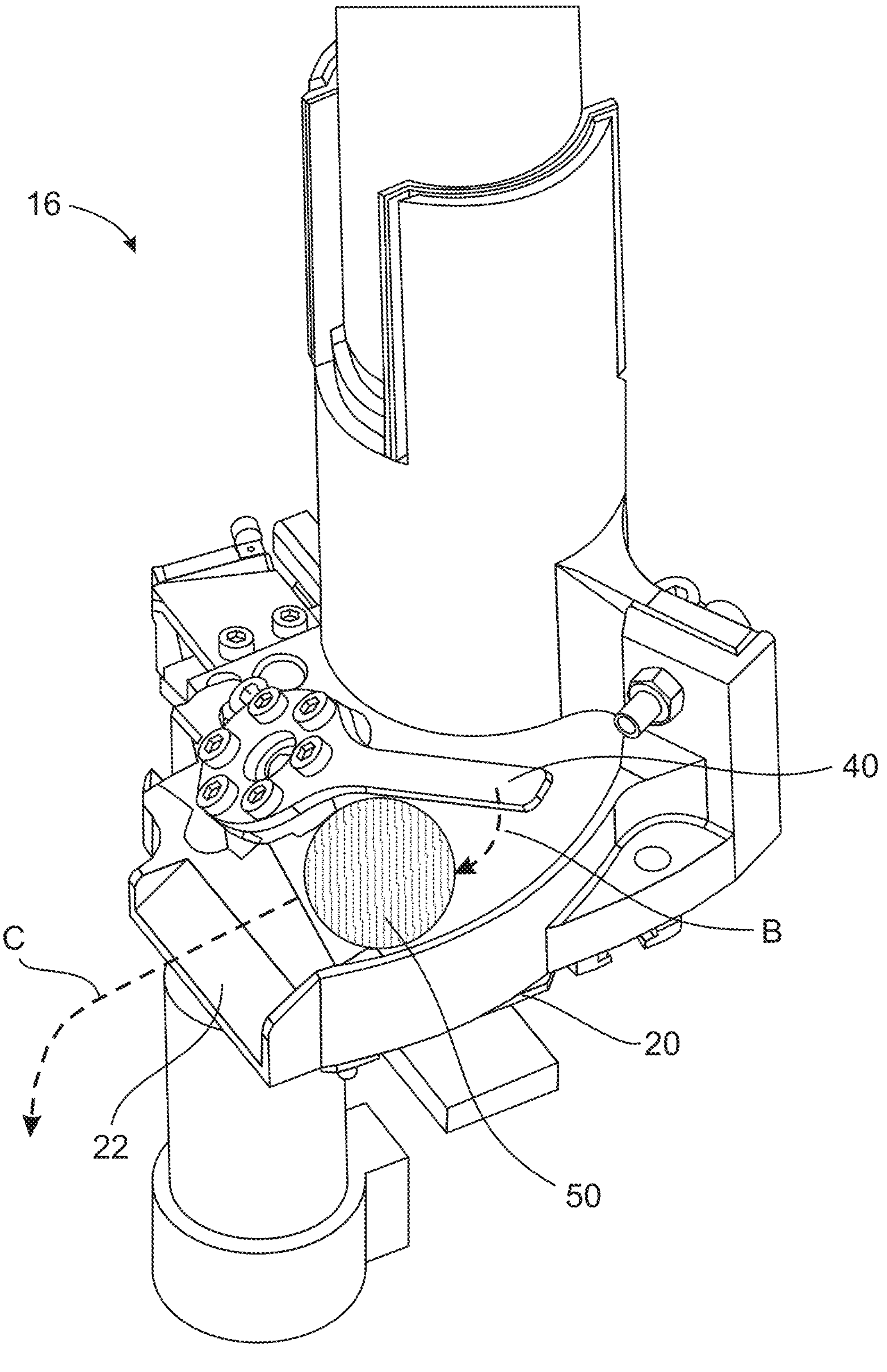
FIG. 6 is a perspective view of the chip dispensing unit of FIG. 3 illustrating the arm in a position to propel the chip down a ramp, according to embodiments of the present disclosure.

In the view of FIG. 6, the arm 40 has pushed chip 50 to a position above RFID reader 20. The arm 40 pauses to enable the RFID reader 20 to read the tag on the chip 50. After reading the tag, the RFID reader 20 communicates the results to the processing circuitry 14. The processing circuitry instructs delivery of a dispensed chip 50 to the chip playing field 30 only when the RFID tag of said dispensed chip 50 corresponds to its preassigned RFID value. Specifically, the processing circuitry 14 instructs positioning of a platform 29 of the chute 24 to deliver the chip either to the chip playing field 30 or the discard bin 34, as discussed above in connection with FIG. 1, and will be discussed below in connection with FIGS. 7-11. Once the platform is in position, the arm 40 continues to move clockwise in the direction of arrow B. This movement causes the arm 40 to propel chip 50 down the ramp 22 in the direction of arrow C.

Figure 7:
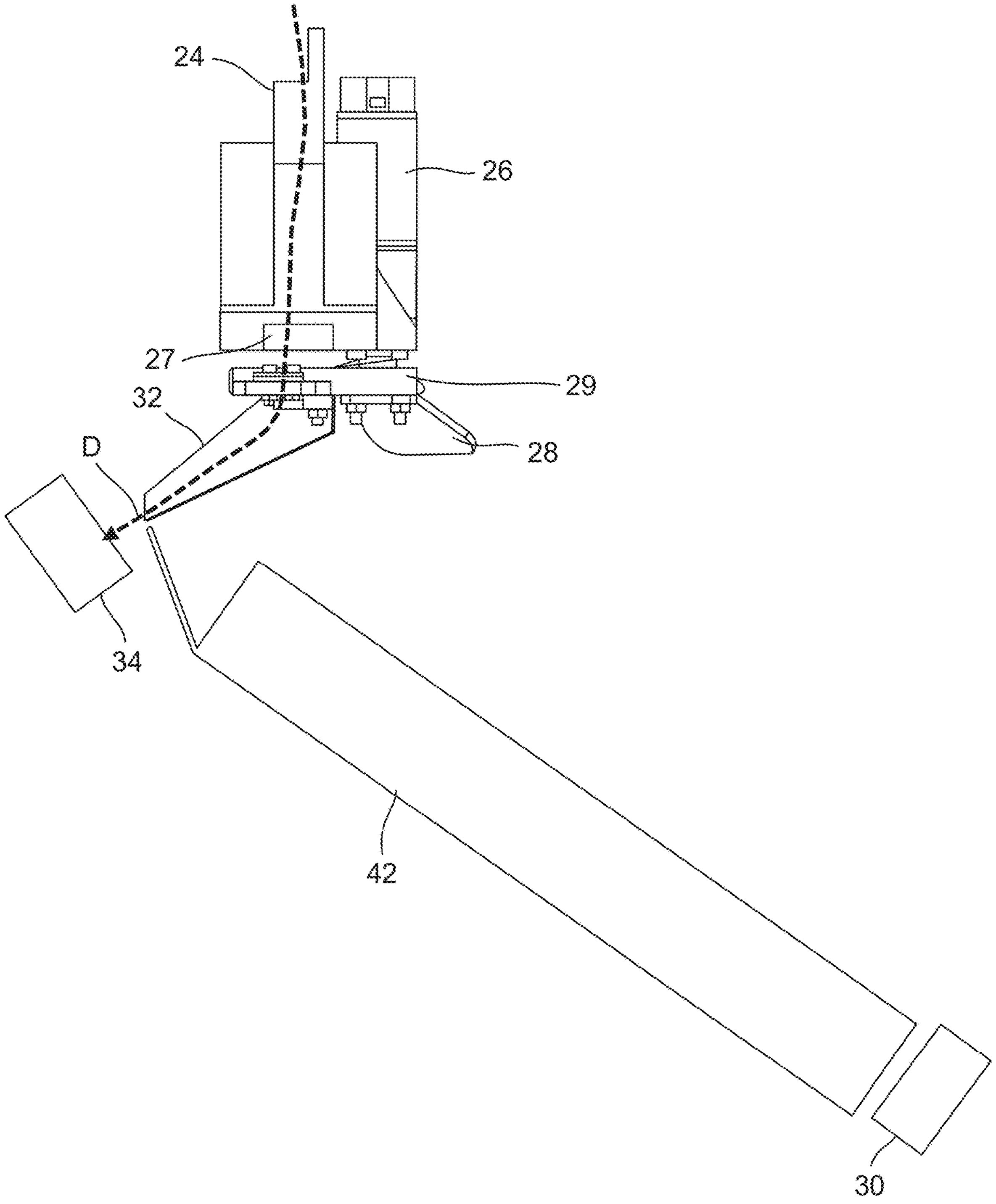
FIG. 7 is a side view of a chute, first outlet slide, and second outlet slide, aligned to direct the chips down the second outlet slide and into a discard bin, according to embodiments of the present disclosure.

FIGS. 7-11 depict different views of chute 24 and the related slides 28, 32, 42 for delivery of the chips 50 to a playing field 30 or to a discard bin 34. Referring to FIG. 7, chute 24 is shown in profile view. A chip enters chute 24 from the top, and travels through the chute along path D until it exits the chute at outlet 27.

Platform 29 is situated below outlet 27, and is attached to first outlet slide 28 and second outlet slide 32. Drive 26 is capable of rotating platform 29 in a circular fashion. The processing circuitry 14 is programmed to instruct the drive 26 to align the first outlet slide 28 with the outlet of the chute 27 when the RFID tag of a respective dispensed chip corresponds to its preassigned RFID value, and to align the second outlet slide 32 with the outlet of the chute 27 when the RFID tag of a respective dispensed chip does not correspond with its preassigned RFID value.

In the configuration of FIG. 7, second outlet slide 32 is aligned with the outlet 27 of chute 24. As a result, the chip continues along track D down second outlet slide 32 and to discard bin 34.

Figure 8:
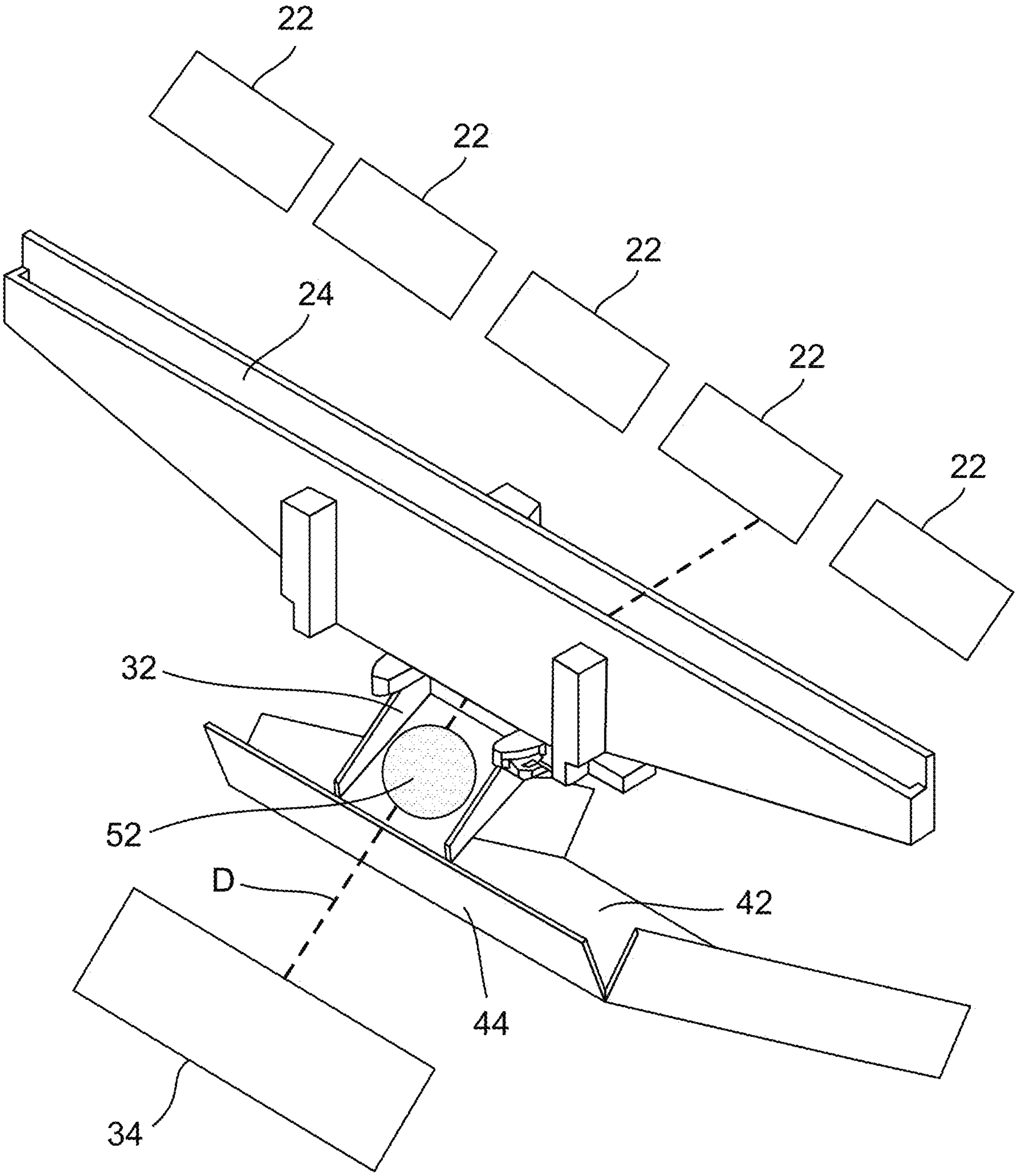
FIG. 8 is an upper rear perspective view of the chute of FIG. 7 illustrating a path of a chip through the chute and down the second outlet slide to the discard bin.

FIG. 8 is an upper perspective view of the chute 24 in the configuration of FIG. 7. As seen in FIG. 8, the chute 24 has a shape of an inverted triangle. Five ramps 22 are arranged lengthwise along the base of the chute 24. Chips from each ramp 22 are deposited into chute 24, and then slide along the slanted edges of the chute 24 until they enter outlet 27 (not shown in FIG. 8). In the illustrated embodiment, chip 52 is a non-conforming chip, and accordingly it is directed along second outlet ramp 32, along path D, to discard bin 34.

Also visible in FIG. 8 is static slide 42 with lip 44. The static slide 42 is used to deliver chips to the chip playing field 30. Lip 44 helps to ensure proper separation between chips 50 heading to the chip playing field 30, and non-conforming chips 52 heading to the discard bin 34. Second outlet slide 32 is sufficiently long that it passes over lip 44, so that chips 52 traveling along path D do not fall onto first outlet slide 42

Figure 9:
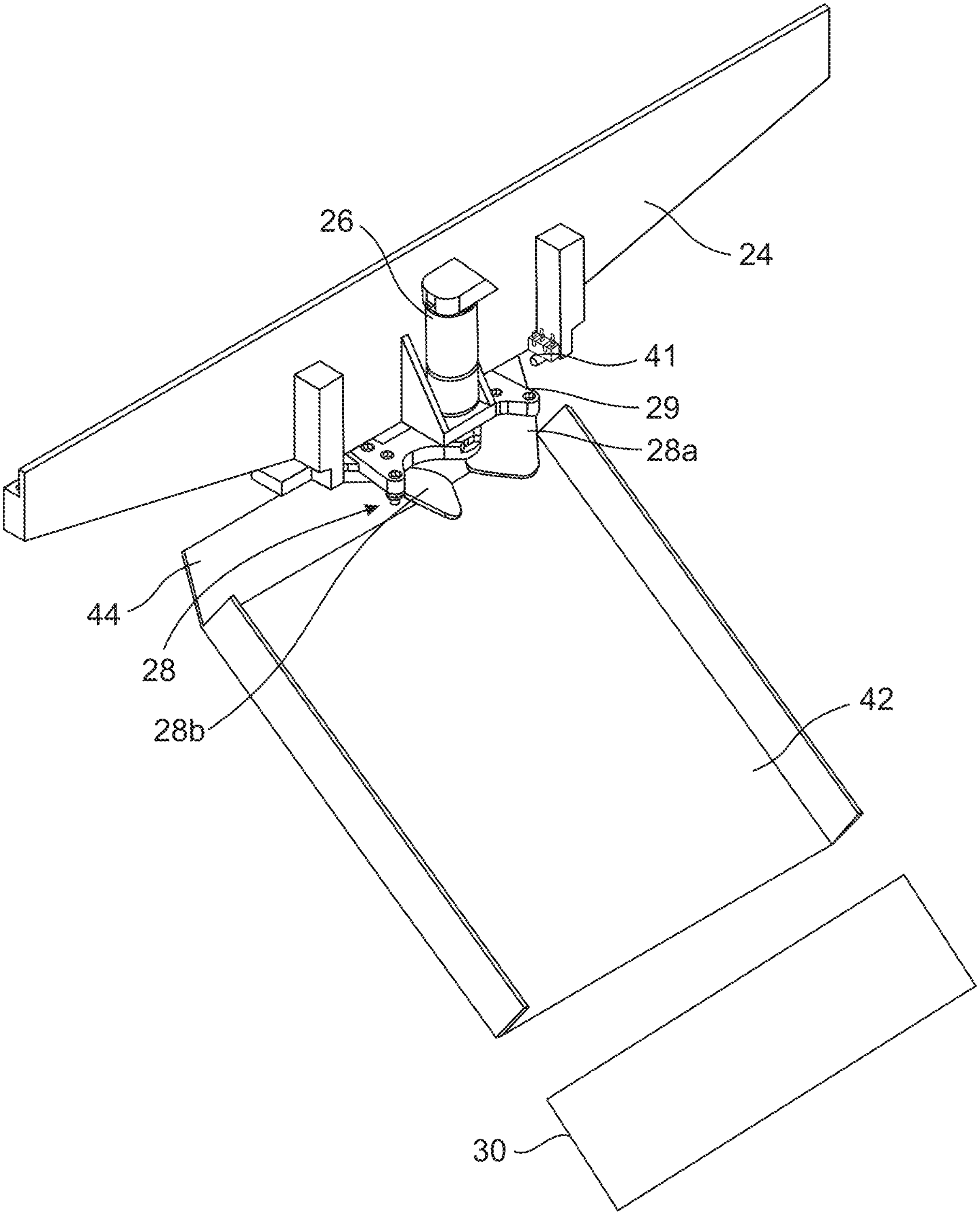
FIG. 9 is an upper front perspective view of the chute of FIG. 7, illustrating components of the first outlet slide.

FIG. 9 depicts another view of chute 24. As in the views of FIG. 7 and FIG. 8, the platform 29 is oriented such that the outlet 27 is aligned with the second outlet slide 32. In this view, the shape of first outlet slide 28 is visible. In particular, first outlet slide 28 is comprised of two spoons 28*a*, 28*b*. Spoons 28*a*, 28*b* are angled relative to a slope of static slide 42. As a result, when chips are dispensed from spoons 28*a* or 28*b* onto static slide 42, they do not necessarily travel straight down the slide 42, but rather travel in different paths along the slide 42, depending on the angle from which they are dropped from spoons 28*a*, 28*b*. This orientation causes chips to enter the chip playing field 30 at different lateral locations.

Figure 10:
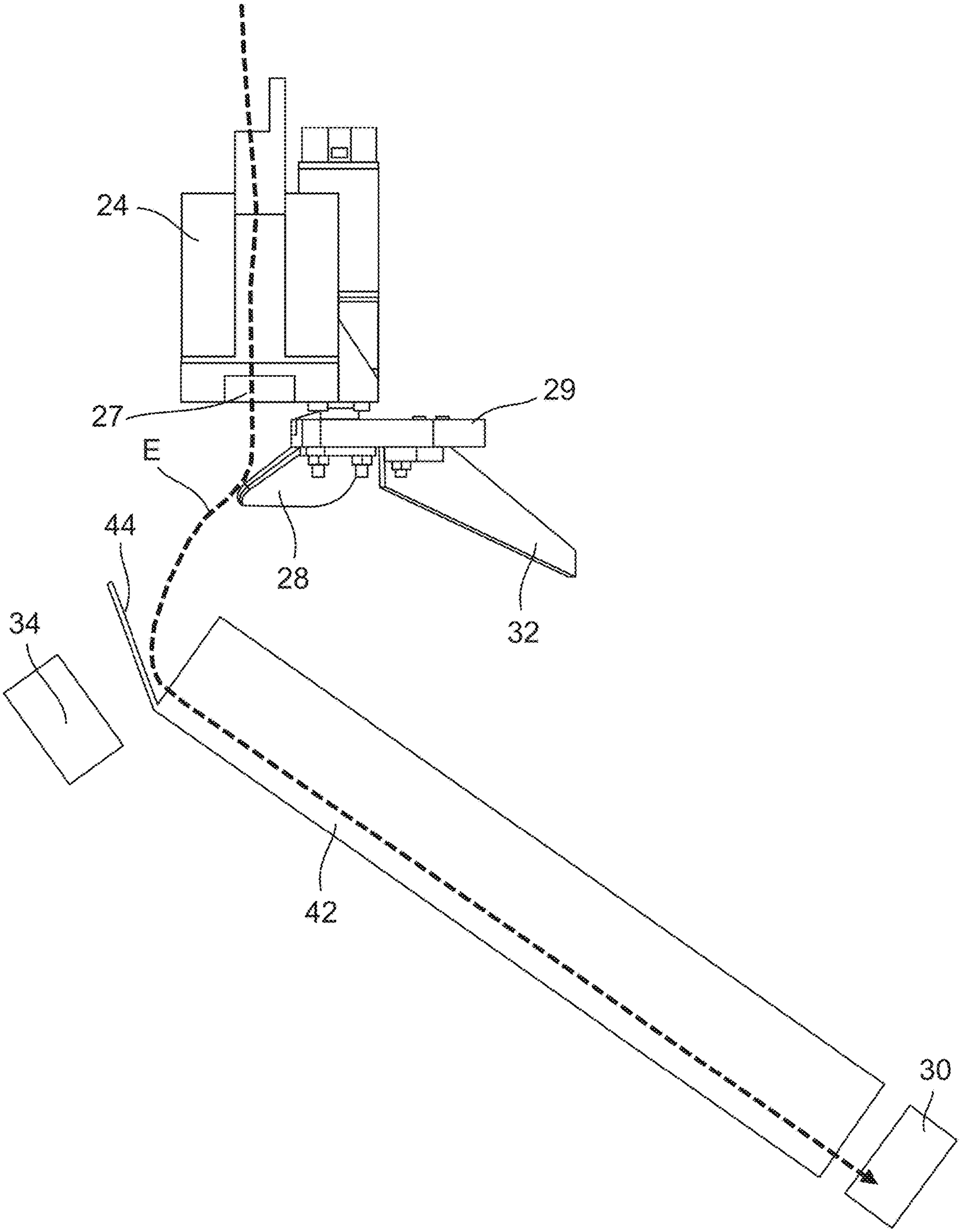
FIG. 10 is a side view of the chute, first outlet slide, and second outlet slide of FIG. 7, aligned to direct the chips down the first outlet slide and into a chip playing field, according to embodiments of the present disclosure.

Referring now to FIG. 10, the chute 24 is depicted in the opposite configuration compared to the configuration of FIGS. 7-9. In the configuration of FIG. 10, platform 29 is arranged such that first outlet slide 28 is aligned with outlet 27 of the chute 24. As a result, a chip 50 travels along path E through outlet 27, onto first outlet slide 28, optionally against lip 44, and down static slide 42 to chip playing field 30.

Figure 11:
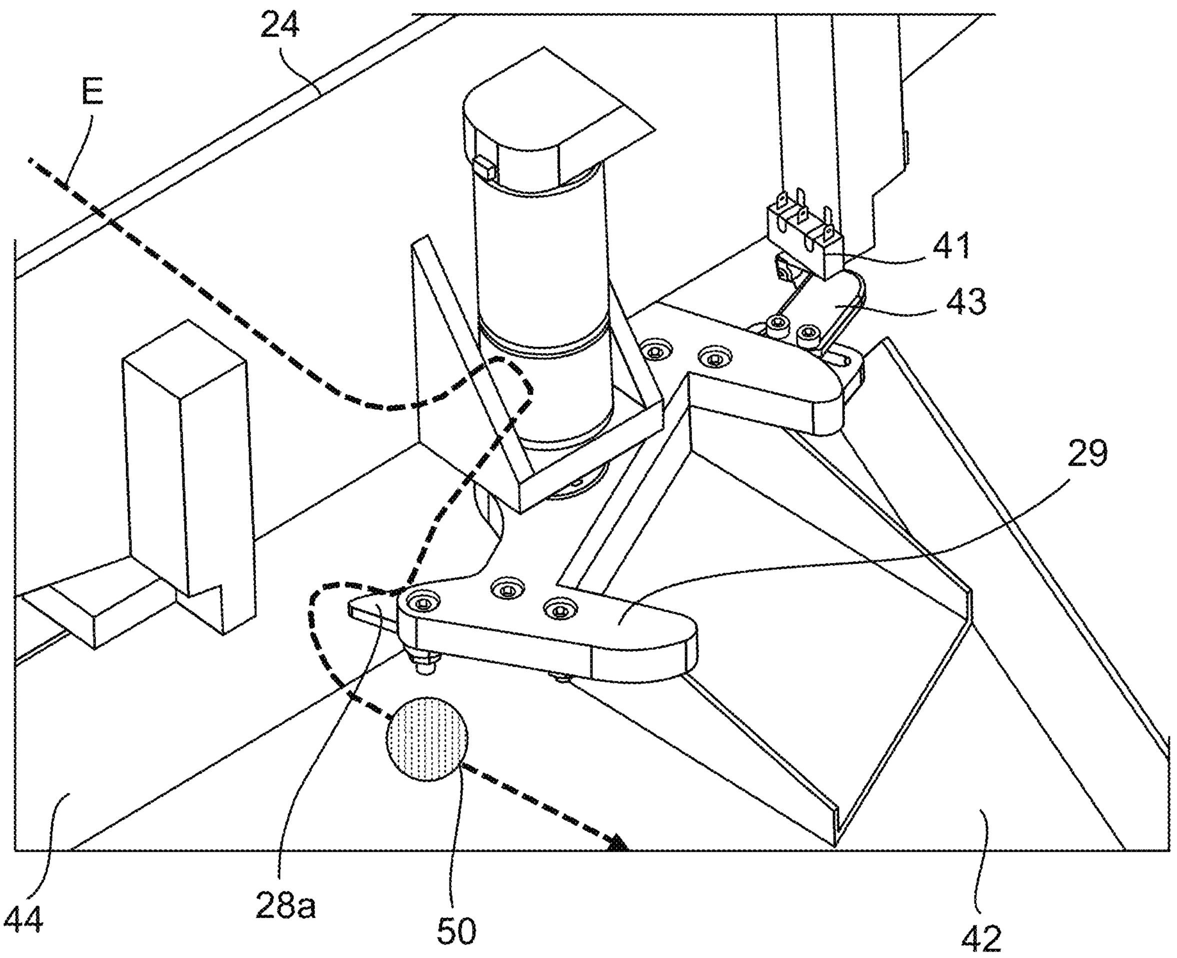
FIG. 11 is an upper front perspective view of the chute of FIG. 10 illustrating rotation of the first outlet slide and a path of a chip through the chute and down the first outlet slide to the chip playing field.

FIG. 11 depicts an upper perspective view of the chute 24 in a position in which the first outlet slide 28 is aligned with the outlet 27 of the chute 24. As illustrated in FIG. 11, chip 50 enters the chute 24 from above, and proceeds through outlet 27 (not shown in FIG. 11), onto spoon 28*a* (which is partially obscured by platform 29), off of lip 44 and onto static slide 42. As shown in FIG. 11, the first outlet slide 28 is rotated relative to static slide 42, so that spoon 28*a* is not parallel to lip 44 or static slide 42. As a result, chip 50 slides down static slide 42 at an angle. This rotation occurs because the processing circuitry 14 is programmed to instruct the platform 29 to rotate in a randomized fashion when the outlet 27 is aligned with the first outlet slide 28. This randomized rotation further enables the chips to be dispensed toward varied locations along the width of static slide 42 and chip playing field 30.

Optionally, as shown in FIG. 11, a microswitch 41 is located on the chute 24, and a tongue 43 is located on the platform 29. The microswitch is connected to the processing circuitry 14 and is used to identify a location of the platform 29. Specifically, after each randomized rotation of platform 29, the tongue 43 comes into contact with microswitch 41. The contacting of tongue 43 with microswitch 41 is akin to a reset switch for the randomized movement, signifying that one randomized movement is completed, and allowing for execution of the next randomized movement.

Figure 12:
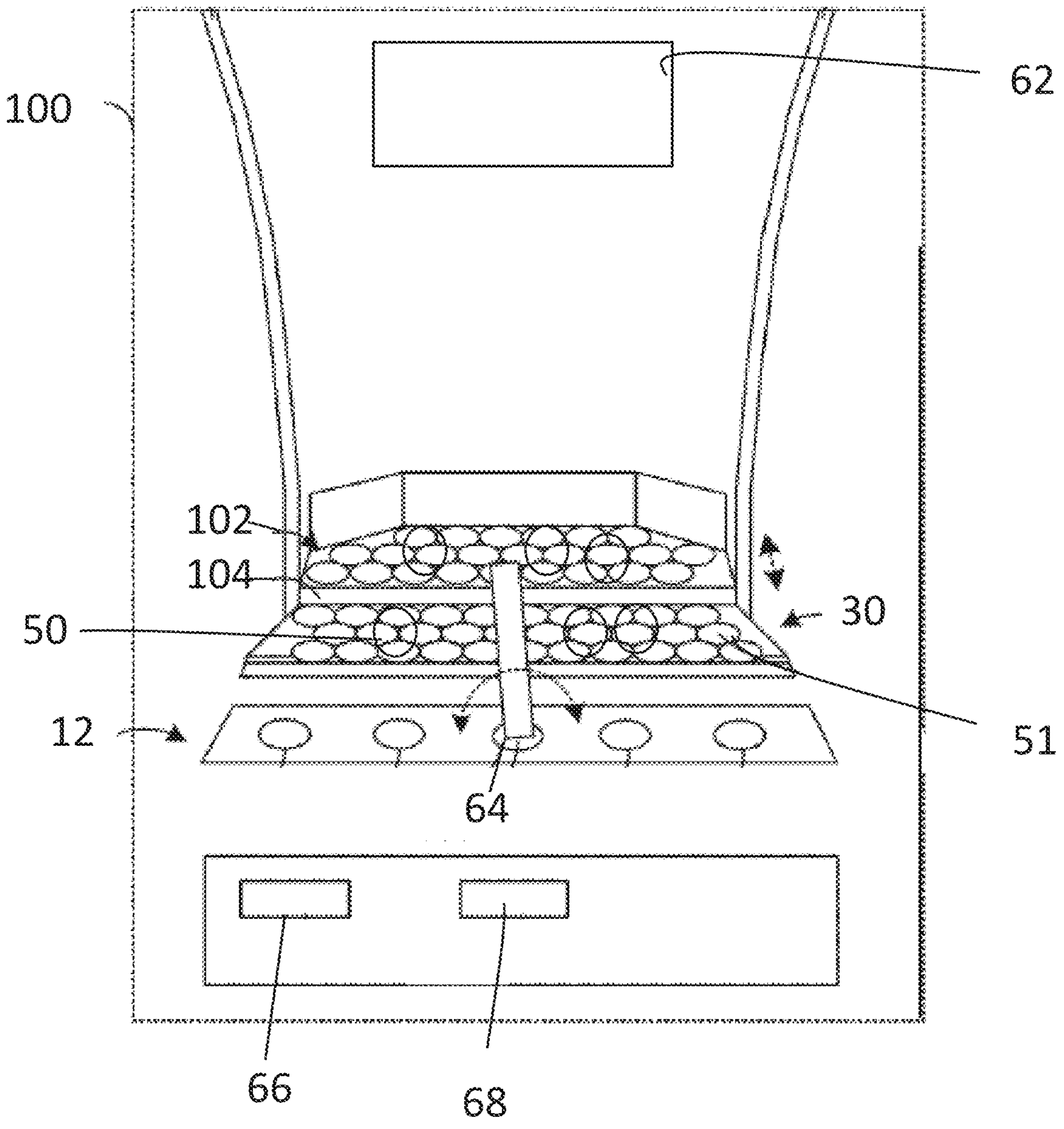
FIG. 12 is a schematic depiction of a coin pusher type incorporating a chip dispensing system, according to embodiments of the present disclosure.

FIG. 12 depicts an exemplary coin pusher game 100 including the chip dispensing system of embodiments of the present disclosure. The chip playing field 30 is comprised of moving shelf 102 and stationary shelf 104. Chips 50 and coins 51 are on both moving shelf 102 and stationary shelf 104. Moving shelf 102 may move forward and backward on top of stationary shelf 104, as indicated by the double arrow. Input interface 12 includes a plurality of buttons, such as for entering a wager. The game 100 further includes a screen 62 for communicating values of wagers and winnings to the player, and a gun 64 for shooting coins onto the chip playing field 30. The game 100 may optionally include input-output slots 66 and 68, which may be used, for example, to insert a player's game playing card therein, or to output a receipt or tickets indicative of a player's winnings.

During game play, a player aims the gun 64 in such a fashion as to cause chips 50 to be dislodged from the chip playing field 30. The dislodged chips 50 are collected by the player and redeemed for money. Alternatively, the chips are recycled in a closed loop within the game, and an RFID reader located at an exit of the chip playing field 30 reads the value of the dislodged chips 50 and credits the corresponding value to an account of the player. In some embodiments, the dislodged chips 50 are collected manually, and are sorted and placed into new magazines 18 for reloading into chip dispensing units 16. Alternatively, as discussed above, the dislodged chips are sorted automatically with a sorting machine located near the exit of the chip playing field 30, and are conveyed automatically back to magazines 18.

While the foregoing embodiments describe the use of an RFID reader in order to achieve quality control, other quality control devices may be used instead. For example, a video analyzer may be used to identify the chips that enter the chip playing field and verify that they are correct. This verification may be performed, for example, by identification of markings that are placed on the chips. The video analyzer may be connected to a camera system. For example, each chip dispensing unit may have a camera associated with it. The video analyzer evaluates images from the camera to determine whether each chip dispensed from the magazine has the correct markings. In addition to identifying the chips, the camera system may be used to image the chip playing field and other parts of the real money game. Based on the images projected from the cameras, users may play the real money game remotely.

It is expected that during the life of a patent maturing from this application many real-money games with chip playing fields will be developed that are suitable for the functions described herein, and the scope of the terms real-money game and chip playing field is intended to include all such new technologies a priori.

As used herein the term “about” refers to +10%.

The terms “comprises”, “comprising”, “includes”, “including”, “having” and their conjugates mean “including but not limited to”. This term encompasses the terms “consisting of” and “consisting essentially of”.

The phrase “consisting essentially of” means that the composition or method may include additional ingredients and/or steps, but only if the additional ingredients and/or steps do not materially alter the basic and novel characteristics of the claimed composition or method.

As used herein, the singular form “a”, “an” and “the” include plural references unless the context clearly dictates otherwise. For example, the term “a compound” or “at least one compound” may include a plurality of compounds, including mixtures thereof.

The word “exemplary” is used herein to mean “serving as an example, instance or illustration”. Any embodiment described as “exemplary” is not necessarily to be construed as preferred or advantageous over other embodiments and/or to exclude the incorporation of features from other embodiments.

The word “optionally” is used herein to mean “is provided in some embodiments and not provided in other embodiments”. Any particular embodiment of the invention may include a plurality of “optional” features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A chip dispensing system for gaming, comprising:

a plurality of chip dispensing units, each chip dispensing unit comprising: a magazine for storing chips, wherein each chip is assigned a monetary value, a ramp extending from an outlet of the magazine, and an arm for propelling each dispensed chip down the ramp and toward a chip playing field; and a processing circuitry configured to:

monitor a cumulative value of a series of wagers over a time period, and to determine that a cumulative value of chips dispensed toward the playing field within the time period corresponds to a predefined return-to-player percentage of the series of wagers;

following receipt of a wager, calculate a value of chips to be added to the chip playing field in order to maintain the predefined return-to-player percentage; and instruct one or more of the chip dispensing units to dispense chips having a collective value equivalent to the calculated value toward the chip playing field;

wherein each chip comprises an RFID tag, each chip dispensing unit comprises an RFID reader, and the processing circuitry is configured to compare a RFID value read from each chip with a preassigned RFID value for said chip, and to instruct delivery of a dispensed chip to the chip playing field chip only when the RFID tag of said dispensed chip corresponds to its preassigned RFID value.

2. The chip dispensing system of claim 1, wherein the chip dispensing units are configured to dispense chips having a plurality of different monetary values, and wherein each respective chip dispensing unit is configured to dispense chips only having the same monetary value.

3. The chip dispensing system of claim 2, wherein the processing circuitry is further configured to determine a combination of chips required to be dispensed from each of the chip dispensing units in order to arrive at the calculated value, and to instruct the chip dispensing units to dispense chips in accordance with the determined combination.

4. A coin-pusher type game including the chip dispensing system of claim 1, wherein the chip playing field comprises at least one moving shelf and at least one stationary shelf.

5. The chip dispensing system of claim 1, further comprising dispensing chips having a plurality of different monetary values from different chip dispensing units, while dispensing chips only having the same monetary value from each respective chip dispensing unit.

6. The chip dispensing system of claim 5, further comprising determining a combination of chips required to be dispensed from each of the chip dispensing units in order to arrive at the calculated value, and instructing the chip dispensing units to dispense chips in accordance with the determined calculation.

7. The chip dispensing system of claim 1, wherein the chip playing field comprises at least one moving shelf and at least one stationary shelf in a coin-pusher type game.

8. A chip dispensing system for gaming, comprising:

a plurality of chip dispensing units, each chip dispensing unit comprising: a magazine for storing chips, wherein each chip is assigned a monetary value, a ramp extending from an outlet of the magazine, and an arm for propelling each dispensed chip down the ramp and toward a chip playing field; and a processing circuitry configured to:

monitor a cumulative value of a series of wagers over a time period, and to determine that a cumulative value of chips dispensed toward the playing field within the time period corresponds to a predefined return-to-player percentage of the series of wagers;

following receipt of a wager, calculate a value of chips to be added to the chip playing field in order to maintain the predefined return-to-player percentage;

instruct one or more of the chip dispensing units to dispense chips having a collective value equivalent to the calculated value toward the chip playing field; and a chute configured to receive chips propelled from each chip dispensing unit, a first outlet slide configured to deliver dispensed chips from the chute to a static slide leading to the chip playing field, and a second outlet slide configured to deliver dispensed chips from the chute to a discard bin, and a drive for aligning one of the first or second outlet slides with an outlet of the chute, wherein the processing circuitry is configured to instruct the drive to align the first outlet slide with the outlet of the chute when the RFID tag of a respective dispensed chip corresponds to its preassigned RFID value, and to align the second outlet slide with the outlet of the chute when the RFID tag of a respective dispensed chip does not correspond with its preassigned RFID value.

9. The chip dispensing system of claim 8, wherein the first outlet slide comprises a plurality of spoons angled relative to a slope of the static slide.

10. The chip dispensing system of claim 8, wherein the drive is further configured to rotate an angle of the first outlet slide relative to the static slide, and the processing circuitry is further configured to instruct the drive to rotate the first outlet slide relative to the static slide prior to delivery of dispensed chips from the chute to the static slide.

11. The chip dispensing system as defined in claim 10, wherein the processing circuitry is configured to instruct rotation of the first outlet slide so as to randomly vary a location in the chip playing field onto which chips are dispensed.

12. A method for dispensing chips for gaming, comprising:

monitoring a cumulative value of a series of wagers over a time period, and determining that a cumulative value of chips dispensed into a chip playing field within the time period corresponds to a predefined return-to-player percentage of the series of wagers;

following receipt of a wager, calculating a value of chips to be added to the chip playing field in order to maintain the predefined return-to-player percentage;

instructing one or more chip dispensing units to dispense chips toward the chip playing field, wherein each chip is assigned a monetary value, and the dispensed chips have a collective value equivalent to the calculated value, wherein each chip dispensing unit comprises a magazine for storing chips, a ramp extending from an outlet of the magazine, and an arm for propelling each dispensed chip down the ramp and toward the chip playing field; and dispensing the chips having said collective value toward the chip playing field;

wherein each chip comprises an RFID tag, each chip dispensing unit further comprises an RFID reader, and the method further comprises reading the RFID tag with the RFID reader, comparing the RFID value read from each chip with a preassigned RFID value for said chip, and delivering a dispensed chip into the chip playing field only when the RFID tag of said dispensed chip corresponds to a preassigned RFID value for said dispensed chip.

13. The method of claim 12, wherein a chute is configured to receive chips dispensed from each chip dispensing unit, a first outlet slide is configured to deliver dispensed chips from the chute to a static slide leading to the chip playing field, and a second outlet slide is configured to deliver dispensed chips from the chute to a discard bin, and the method further comprises instructing a drive to align the first outlet slide with an outlet of the chute when the RFID tag of a respective dispensed chip corresponds to its preassigned RFID value, and to align the second outlet slide with the outlet of the chute when the RFID tag of a respective dispensed chip does not correspond with its preassigned RFID value.

14. The method of claim 13, wherein the first outlet slide comprises a plurality of spoons angled relative to a slope of the static slide.

15. The method of claim 13, further comprising rotating an angle of the first outlet slide relative to the static slide prior to delivery of dispensed chips from the chute to the static slide.

16. The method of claim 15, wherein the rotating step is performed so as to randomly vary a location on the chip playing field onto which chips are dispensed.

* * * * *